United States Patent [19]
Arnold et al.

[11] 4,071,757
[45] Jan. 31, 1978

[54] DETECTION OF BEHIND CASING WATER FLOW AT AN ANGLE TO THE AXIS OF A WELL BOREHOLE

[75] Inventors: Dan M. Arnold; Hans J. Paap, both of Houston, Tex.

[73] Assignee: Texaco Inc., New York, N.Y.

[21] Appl. No.: 698,398

[22] Filed: June 21, 1976

[51] Int. Cl.$^2$ ............................................. G01V 5/00
[52] U.S. Cl. .................................... 250/265; 250/270
[58] Field of Search ............... 250/264, 265, 266, 270, 250/259

[56] References Cited
U.S. PATENT DOCUMENTS

| | | |
|---|---|---|
| 3,603,795 | 9/1971 | Allaud .................................... 250/264 |
| 3,851,171 | 11/1974 | Saniford et al. ...................... 250/259 |

*Primary Examiner*—Davis L. Willis
*Attorney, Agent, or Firm*—Carl G. Ries; Thomas H. Whaley; William J. Beard

[57] ABSTRACT

Methods and apparatus are disclosed herein for detecting undesired water flow at an angle to the axis of a well borehole. The borehole envisons is irradiated with 14 MEV neutrons resulting in the in situ creation of the radioactive tracer element $N^{16}$ in the flowing water. Two spaced gamma ray detectors are used to sense gamma rays produced by the decay of this radioactive isotope. The distance from the center of each detector to the center of the flowing water is used to establish the angle of flow with respect to the well tool, the linear flow rate of the flow $v$ and the volume flow rate $V$ of the undesired water flow.

12 Claims, 10 Drawing Figures

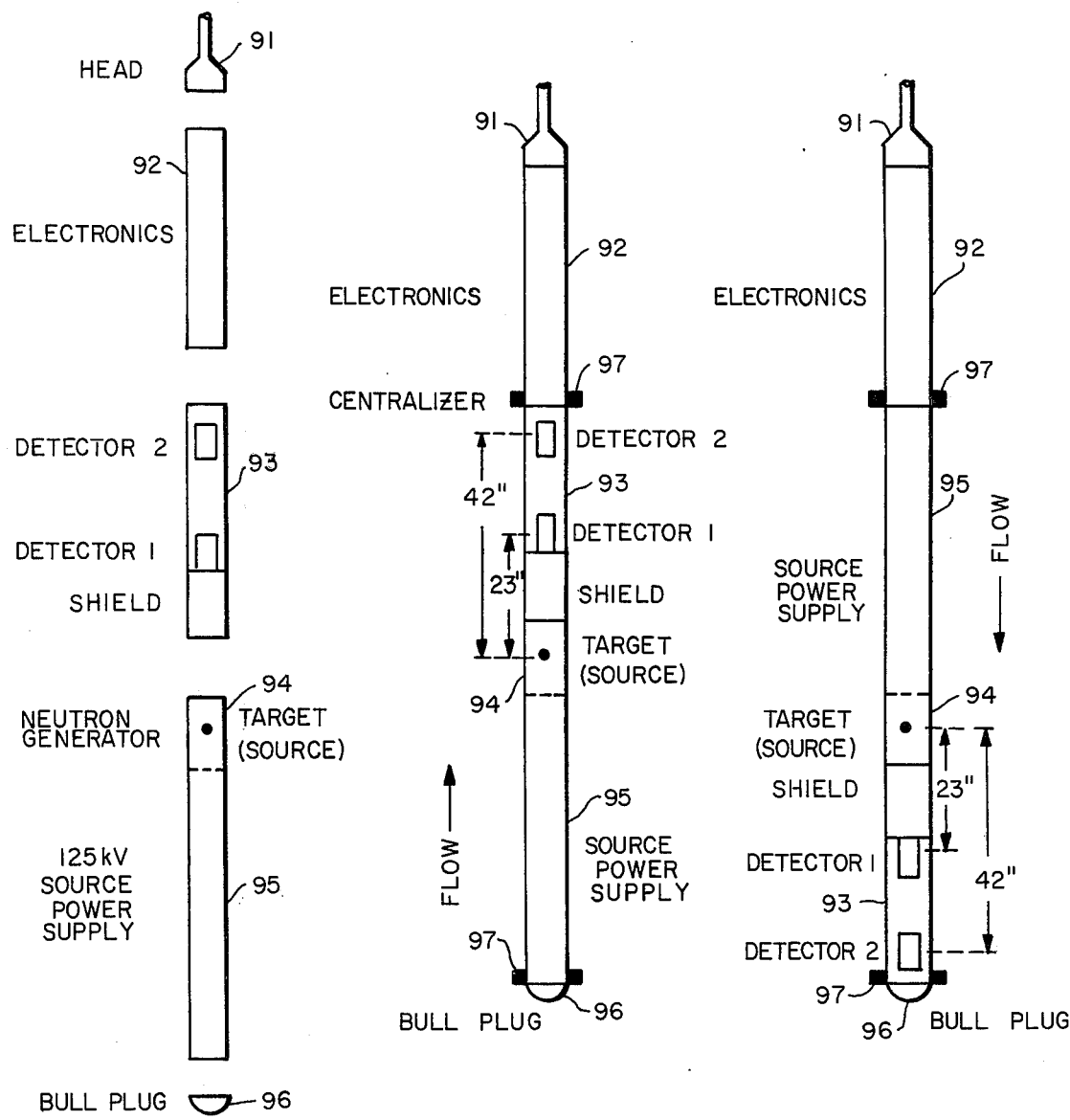

DETECTION OF BEHIND CASING WATER FLOW AT AN ANGLE TO THE AXIS OF A WELL BOREHOLE

BACKGROUND OF THE INVENTION

This invention relates to well logging methods and apparatus and more particularly to nuclear well logging techniques to determine the presence of undesired water flow in cement voids or channels behind steel well casing in a cased well borehole.

Undesired fluid communication along the cased in portion of a well between producing zones has long been a problem in the petroleum industry. The communication of fresh or salt water from a nearby water sand into a petroleum production sand can contaminate the petroleum being produced by the well to an extent that production of petroleum from the well can become commercially unfeasible due to the "watercut". Similarly, in near surface water wells used for production of fresh water for city or town drinking supply by the migration of salt water from nearby sands can also contaminate the drinking water supply to the extent where it is unfit for human consumption without elaborate contaminant removal processing.

In both of these instances, it has been found through experience over the course of years that the contamination of fresh water drinking supplies or producing petroleum sands can occur many times due to the undesired communication of water from nearby sands down the annulus between the steel casing used to support the walls of the borehole and the borehole wall itself. Usually steel casing which is used for this purpose is cemented in place. If a good primary cement job is obtained on well completion there is no problem with fluid communication between producing zones. However, in some areas of the world where very loosely consolidated, highly permeable sands are typical in production of petroleum, the sands may later collapse in the vicinity of the borehole even if a good primary cement job is obtained. This can allow the migration of water along the outside of the cement sheath from a nearby water sand into the producing zone. Also, the problem of undesired fluid communication occurs when the primary cement job itself deteriorates due to the flow of fluids in its vicinity. Similarly, an otherwise good primary cement job may contain longitudinal channels or void spaces along its length which permit undesired fluid communication between nearby water sands and the producing zone.

Another problem which can lead to undesired fluid communication along the borehole between producing oil zones and nearby water sands is that of the so called "microannulus" between the casing and the cement. This phenomenon occurs because when the cement is being forced from the bottom of the casing string up into the annulus between the casing and the formations, (or through casing perforations), the casing is usually submitted to a high hydrostatic pressure differential in order to force the cement into the annulus. The high pressure differential can cause casing expansion. When this pressure is subsequently relieved for producing from the well, the previously expanded casing may contract away from the cement sheath formed about it in the annulus between the casing and the formations. This contraction can leave a void space between the casing and the cement sheath which is sometimes referred to as a microannulus. In some instances, if enough casing expansion has taken place during the process of primary cementing (such as in a deep well where a high hydrostatic pressure is required) the casing may contract away from the cement sheath leaving a microannulus sufficiently wide for fluid to communicate from nearby water sands along the microannulus into the producing perforations and thereby produce an undesirable water cut.

There have been many attempts in the prior art to evaluate and locate the existance of cement channels. There have also been many attempts in the prior art to locate and confirm the existance of so called microannulus fluid communication problems. Perhaps primary among these attempts in the prior art has been that of the use of the acoustic cement bond log. In this type of logging operation, the amplitude of acoustic wave energy which is propogated along the casing from the acoustic transmitter to one or more acoustic receivers is examined. In principle, if the casing is firmly bonded to the cement and to the formations, the acoustic energy propogated along the casing should radiate outwardly from the casing into the cement and surrounding formations, thereby reducing the amplitude of the casing signal. However, if the casing is poorly bonded to the cement or if the cement is poorly bonded to the formations, a void space exists and the acoustic energy should remain in the casing and arrive at the acoustic energy receivers at a much higher amplitude than if a good cement bond existed between the casing, the cement and the formations.

Acoustic cement bond logging, however, cannot always reliably detect the existance of a microannulus which can in some instances permit undesirable fluid communication between water sands and nearby producing zones. If the microannulus is sufficiently small and fluid filled, the acoustic energy propagated along the casing may be coupled across it. Yet it has been found that even such a small microannulus can permit undesirable fluid communication between producing zones. Similarly, a poor quality cement job may go undetected by the use of the acoustic cement bond log if the cement sheath is permeated by a variety of channels or void spaces which are located unsymmetrically about its circumference. Such channels or void spaces can permit undesirable fluid flow while the main body of cement is bonded well to the casing and the formations thus propagating the acoustic energy satisfactorily from the casing outwardly through the cement and into the formations. Therefore, such means as acoustic cement bond well logging have been proven to be not entirely reliable for the detection of potential undesired fluid communication paths in a completed well.

Another approach to locating well spaces or channels in the cement sheath in the prior art has been to inject radioactive tracer substances such as Iodine 131 or the like through producing perforations into the producing formations and into any void spaces in the annulus surrounding the well casing. The theory in this type of operation is that if the tracer material can be forced backward along the flow path of the undesired fluid its radioactive properties may then be subsequently detected behind the casing by radiation detectors. This type of well logging operation has usually proven to be unsatisfactory however, particularly in loosely consolidated sand formations which is precisely where undesired fluid communication is most typically encountered.

In particularly permeable formations such as loosely consolidated sands, the producing formation itself can absorb most of the radioactive tracer material which is forced through the perforations. Very little, if any, of the tracer material can be forced back along the path of undesired fluid flow, particularly, if this involves forcing the flow of tracer against either formations fluid pressure or upward against the force of gravity. Therefore, such tracer logging techniques for detecting cement channels or voids behind the casing have usually prove ineffective in the prior art.

BRIEF DESCRIPTION OF THE INVENTION

The prior art attempts may thus be characterized generally as attempts to evaluate the cement sheath. The present invention relates to methods and apparatus for detecting the undesired flow of water itself in cement channels or voids behind the casing in a producing well. The nuclear well logging techniques used in the present invention involve the activation by high energy neutrons of elemental oxygen nuclei comprising a portion of the undesirable water flow itself. A source of high energy neutrons is placed inside the well borehole opposite the area to be investigated for cement channeling or undesired fluid communication along the sheath. A source of approximately 14 MEV monoenergetic neutrons is used to irradiate the area with such neutrons. An oxygen 16 nucleus upon the capture of an approximately 10 MEV neutron is transmuted to radioactive nitrogen 16. The radioactive nitrogen 16 decays with a half life of about 7.1 seconds by the emission of a beta particle and high energy gamma rays having energies of approximately 6 MEV or more. With a sufficiently high flux of 10 MEV neutrons irradiating the undesired water flowing in a cement void, or microannulus channel, enough radioactive nitrogen 16 is created in the undesired water flow itself to be detectable at a pair of longitudinally spaced detectors. This measurement can be used directly to indicate the speed of flow of the water in the cement channels. Moreover, novel techniques are developed in the invention for determining the volume flow rate of water in such cement channels, microannulus or void spaces from the degradation of the high energy gamma ray spectrum by Compton scattering of gamma rays produced by the decay of the radioactive nitrogen 16. The approximate distance from a single gamma ray detector to the mean center of the water flow path may be thus determined. Yet another feature of the invention is that by the use of a pulsed, rather than continuous, neutron source for the measurements described, a more accurate flow detection is provided by reducing the background gamma radiation caused by relatively prompt thermal or epithermal neutron interactions in the vicinity of the borehole.

Moreover, by first placing a longitudinally spaced high energy gamma ray detector pair above and then by placing the detector pair below the neutron source, fluid flow occurring within and without the casing may be distinguished with the use of only relatively valid assumptions. In another feature of the present invention the detection of water flow in a direction non-parallel to the borehole axis is provided.

The above objects, features and advantages of the present invention are pointed out with particularly in the appended claims. The invention may best be understood, however, by reference to the following detailed description thereof when taken in conjunction with the accompanying drawings.

BRIEF DESCRIPTION OF THE DRAWINGS

FIG. 6A-C is a schematic representation of the downhole portion of a modular water flow detection sonde according to the invention.

DETAILED DESCRIPTION OF THE INVENTION

Before considering a detailed description of hardware systems employed to measure the flow rate of water behind the casing according to the concepts of the present invention, it will be helpful to consider the theoretical basis for the measurement according to the principles of the invention.

The techniques of the present invention are predicated upon the creation of the unstable radioactive isotope nitrogen 16 in the stream of water flowing behind the casing which is to be detected. This is accomplished by bombarding the flowing water with high energy neutrons having an energy in excess of approximately 10 MEV. This bombardment can cause the creation through nuclear interaction of the unstable nitrogen isotope 16 from the oxygen nuclei comprising the water molecules in the flow stream, the nuclear reaction being $o^{16}(n,p)N^{16}$.

Figure 1:
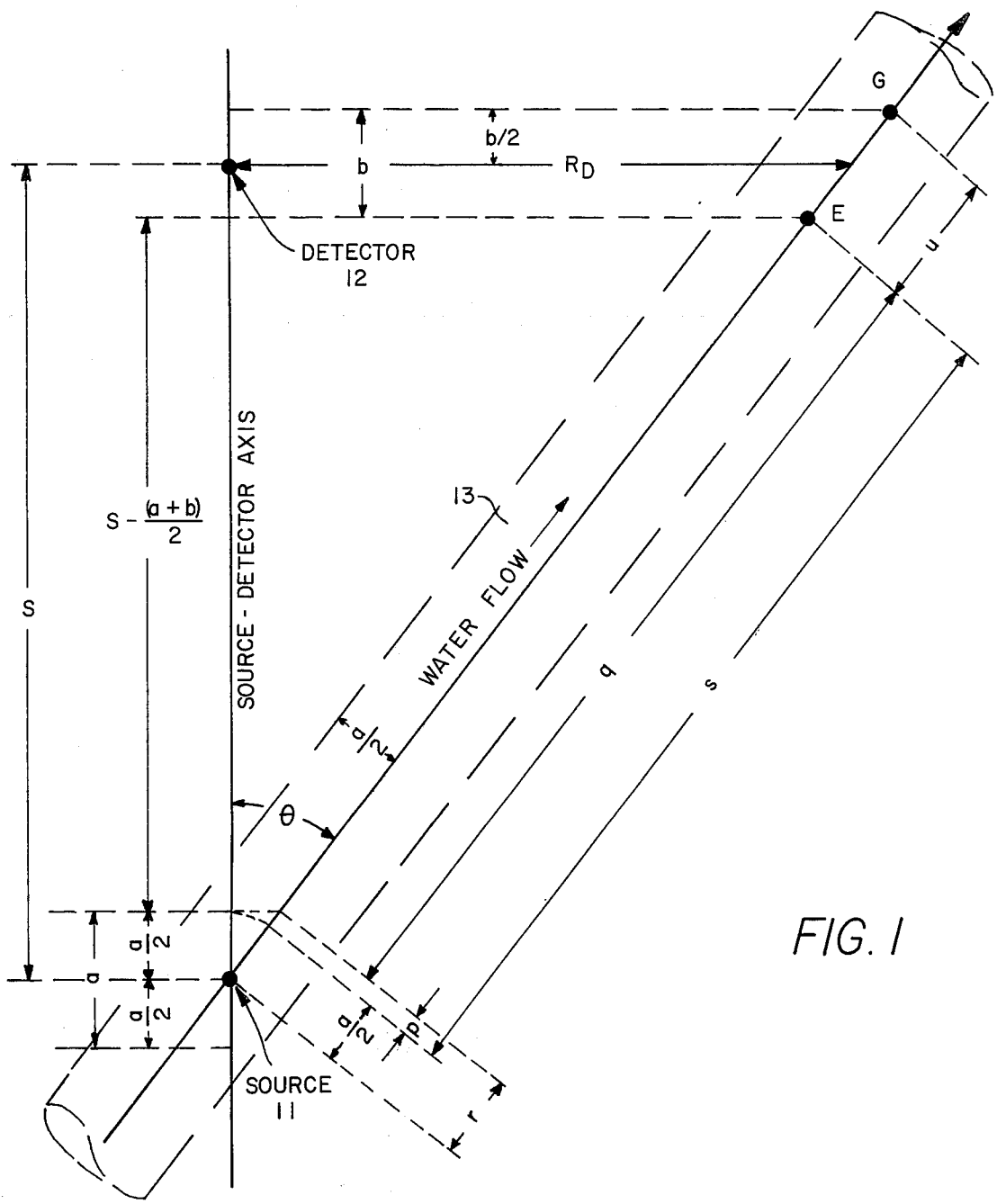
FIG. 1 illustrates schematically the geometry of a single detector water flow sonde for water flow non-parallel to the borehole axis.

Referring intially to FIG. 1, consider a hypothetical downhole fluid tight sonde having a source detector axis as shown and housing a 14 MEV neutron generator 11 and a gamma ray detector 12. The center of the gamma ray detector 12 is spaced S inches from the center of the neutron source 11. Also, consider a channel of water 13 which flows in a direction $\theta$ with respect to the source-detector axis of the sonde and whose center passes over the neutron source 11. The linear flow velocity of the water channel is $v$. It is assumed that as the flow of water approaches the source, an effective volume element of length $a$ and cross-sectional area F is irradiated by neutrons producing $N^{16}$ by the reaction $o^{16}(n,p)N^{16}$. An activity $n \lambda$ of $N^{16}$ is thus induced within an incremental volume element as it flows past the source where:

$$n = \frac{N_o}{M} \rho\sigma\psi_n \lambda K_S(R_S) \int_o^T e^{-\lambda T} \tag{1}$$

-continued $$= \frac{N_o}{M} \rho \sigma \psi_n K_S(R_S) (1 - e^{-\lambda T})$$

where
n = the number of radioactive $N^{16}$ nuclei produced by the $o^{16}(n,p)N^{16}$ reaction
$\lambda$ = the decay constant of $N^{16}$ in sec$^{-1}$
n = the source neutron output in neutrons/cm$^2$/sec
$N_o$ = Avogadro's number
$\rho$ = the density of water in gm/cm
M = the molecular weight of water
$K_S(R_S)$ = a function dependent upon the distance $R_S$ which is measured from the center of the source to the center of the incremental volume element
T = a/v = the time in seconds required for the volume element to move a distance a.
v = the linear flow velocity in inches/second.

Now assume that the activated volume element approaches the detector which is S inches from the source. Also assume that the average detector efficiency length is b inches. The number of counts recorded by the detector as the incremental volume element flows past is given by equation (2) as $$\int_{t_1}^{t_2} n\lambda dt = G \frac{N_o}{M} \rho \sigma \psi_n K_S(R_S) K_D(R_D) [1 - e^{-\lambda a/v}] \cdot \int_{t_1}^{t_2} e^{-\lambda t} dt \quad (2)$$

$$= G \frac{N_o}{M} \rho \sigma \psi_n K_S(R_S) K_D(R_D) [1 - e^{-\lambda a/v}] \lambda^{-1} \cdot [e^{-\lambda t_1} - e^{-\lambda t_2}]$$

where $K_D(R_D)$ is a function dependent upon the distance $R_D$ measured from the center of the detector to the center of the water volume increment and G is a geometric and efficiency constant of the detector. The terms $t_1$ and $t_2$ are times required for the incremental volume element to traverse the distances s and s+u, respectively (see FIG. 1).

Referring to FIG. 1, it can be seen that s which is measured from the point at which the incremental volume element leaves the effective limit of the neutron source to the point at which it enters the effective detection limit of the detector (point E) is $$s = p + q \quad (3)$$

But $$q = [S - \frac{(a+b)}{2}]/\cos\theta \quad (4)$$

and $$p = r(a/2) = [(a/2)/\cos\theta](a/2) \quad (5)$$

Substituting equations (4) and (5) into (3) yields $$s = [S - \frac{(a\cos\theta + b)}{2}]/\cos\theta \quad (6)$$

The time required for the volume element to move the distance s is therefore $$t_1 = s/v = [S - \frac{(a\cos\theta + b)}{2}]/v\cos\theta \quad (7)$$

Likewise $$t_2 = \frac{s+u}{v} = [S - \frac{(a\cos\theta - b)}{2}]/v\cos\theta \quad (8)$$

Substituting equations (7) and (8) into equation (2) yields $$\int_{t_1}^{t_2} n\lambda dt = K_S(R_S)K_D(R_D)\frac{GN_o}{\lambda M} \rho \sigma \phi_n [1 - e^{-\lambda a/v}] \cdot e^{-\lambda(2S - a\cos\theta)/(2v\cos\theta)} [e^{\lambda b/2v\cos\theta} - e^{-\lambda b/2v\cos\theta}] \quad (9)$$

The number of counts per second, C, recorded by the detector can be written as $$C = \frac{\int_{t_1}^{t_2} n\lambda dt}{(t_2 - t_1)} F \cdot a \quad (10)$$

But $$t_2 - t_1 = u/v = b/v\cos\theta = bF/V\cos\theta \quad (11)$$

where V is the volume flow rate in in.$^3$/sec. Substituting equations (9) and (11) into equation (10) yields $$C = \Sigma_o \phi_n GK_S(R_S)K_D(R_D)V\cos\theta\, e^{-\lambda S/v\cos\theta} \cdot [e^{\lambda a/2v} - e^{-\lambda a/2v}] \cdot [e^{\lambda b/2v\cos\theta} - e^{-\lambda b/2v\cos\theta}] \quad (12)$$

where $$\Sigma_o = \frac{N_o \rho \sigma a}{M \lambda b}$$

It is assumed that the neutron flux, $\phi_n$, that irradiates a given incremental volume of water decreases in intensity as a function of $1/R_S^2$ as the volume increment is moved a distance $R_S$ from the source. Similarly, it is assumed that the radiation detected by the detector decreases as a function of $1/R_D^2$ as the distance $R_D$ increases from the detector.

Making the above two assumptions, then the term $K_S(R_S)K_D(R_D)$ can be expressed as:

$$K_S(R_S)K_D(R_D) = P R_S^{-2} R_D^{-2} \quad (13)$$

where P is a calibration constant. Substituting equation (13) into equation (12) yields $$C = \Sigma_o \phi_n GPR_S^{-2}R_D^{-2}V\cos\theta\, e^{-\lambda S/v} \cos\theta [e^{\lambda a/2v} - e^{-\lambda a/2v}][e^{\lambda b/2v\cos\theta} - e^{-\lambda b/2v\cos\theta}] \quad (14)$$

If a second detector spaced a distance S from the source is introduced, the response of both detectors takes the form of equation (14). The ratio of the response of detector 1 (the near detector) to the response of detector 2 (the far detector) is then $$\frac{C_1}{C_2} = \frac{R_2^2}{R_1^2} e^{\lambda(S_2 - S_1)/v\cos\theta} \quad (15)$$

where $S_2$, $S_1$ are the distances from the center of the source to the centers of detectors 2 and 1, respectively, and $R_2$ and $R_1$ are the radial distances from the center of the water flow to the centers of detectors 2 and 1, respectively. Solving equation (15) for v yields $$v = \frac{\lambda(S_2 - S_1)}{\ln\left[\frac{C_1}{C_2} \frac{R_1^2}{R_2^2}\right]\cos\theta} \quad (16)$$

But can be expressed as $$\theta = \tan^{-1}[(R_2 - R_1)/(S_2 - S_1)] \quad (17)$$

Therefore, since $S_1$ and $S_2$ are known parameters of the logging sonde, $C_1$ and $C_2$ are measured quantities, and $R_1$ and $R_2$ can be measured using techniques to be described in more detail subsequently, equations (16) and (17) can be used to determine 1. $v$, the linear flow velocity
2. $\theta$, the angle at which the water flow intersects the axis of the logging sonde (therefore the axis of the borehole).

If the water is due to general fluid movement within a formation whose plane intersects the axis of the borehole at an angle $\theta$, it may be assumed that $$R_S = R_{BH} \quad (18)$$

where $R_{BH}$ is the radius of the borehole and is generally known for caliper logs. If equation (18) is valid, all of the terms in equation (14) for either detector 1 or 2 are either known ($\Sigma$, $a$, $b$, $\lambda$ S), are determined when the sonde is calibrated ($\phi_n$, G, P), are computed ($v$, $\theta$, $R_D$), or the measured (C) with the exception of V. Equation (14) can, therefore, be solved for V, the volume flow rate of water which is moving past the borehole at an angle $\theta$. V is, of course, the primary parameter of interest in water flow detection.

The foregoing discussion has illustrated that by using a well logging sonde containing a 14 MEV neutron source and two gamma ray detectors that the linear flow velocity $v$, the angle of the flow $\theta$ and the volume flow rate V can be obtained if the distance from the center of each of a pair of spaced detector to the center of the water flow can be measured with acceptable accuracy.

In considering the applications and limits of water flow detection behind casing, it is necessary to examine the accuracy to which $v$ can be measured. It will be recalled that equation 16 is used to compute $v$ and that equation 16 contains $C_1C_2$ which is the ratio of counts recorded in the near and far detectors of a water flow detection system. It should be noted that the $C_1C_2$ has associated with it an inherent statistical error since the nuclear decay process of nitrogen 16 isotope is statistical in nature. This statistical error in $C_1C_2$ is an inverse function of the magnitude of $C_1$ and $C_2$. The error in the ratio $C_1C_2$ is therefore affected by any parameter which affects the magnitude of $C_1$ and $C_2$. Parameters such as the source to detector spacing $S_1$ and $S_2$, the distance $R_D$ from the center of a detector to the center of the flow, the cross sectional area F of the flow, the efficiencies of the gamma ray detectors G, the counting interval T, the neutron flux output $\phi_n$ and the background gamma ray counts recorded under no flow conditions all can effect the measurement. It should be noted that although most of these parameters do not appear directly in equation 16 and therefore do not effect the magnitude of $v$, they do affect the accuracy and precision to which $v$ can be measured.

PULSED vs CONTINUOUS NEUTRON SOURCE OPERATION

Figure 2:
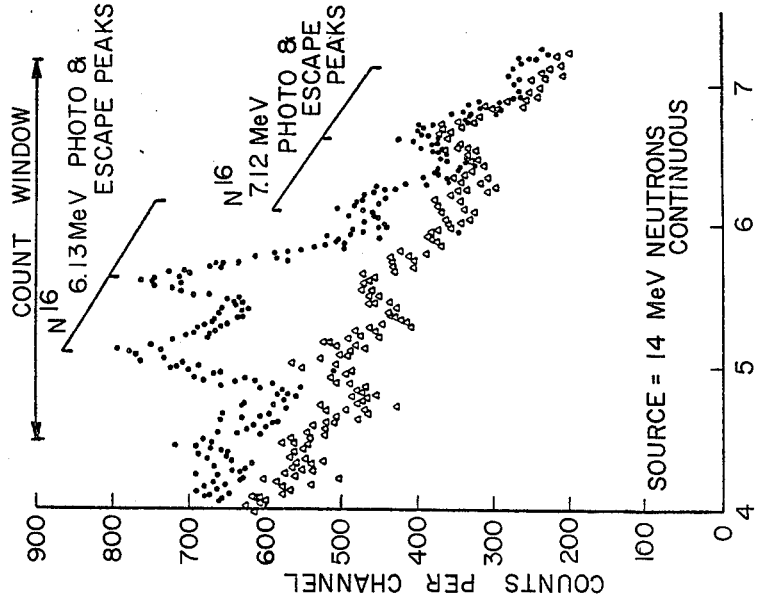
FIG. 2 is a graphical representation of the response of a continuous neutron source water flow detection system under flow and no flow conditions.

Referring now to FIG. 2, a typical set of gamma ray energy spectra recorded under water flow and no water flow conditions is illustrated. The intensity of detected gamma rays at a single spaced detector is plotted as a function of energy in FIG. 2. The 7.12 and 6.13 MEV gamma ray photopeaks chacteristic of $N^{16}$ decay and their corresponding pair production escape peaks are well defined under flow conditions. Some peak structure is also visible, it will be noted, under the no flow conditions. This results from the activation of oxygen 16 in the formation and the borehole in the vicinity of the source and is recorded by the detector even at a spacing of 34 inches as used for the data in FIGS. 2 and 3. This background spectrum also contains radiation from thermal neutron capture gamma rays from the formation, casing, and sonde. It will be seen that this source of background radiation can be eliminated by pulsing the neutron source in the manner to be subsequently described.

Figure 3:
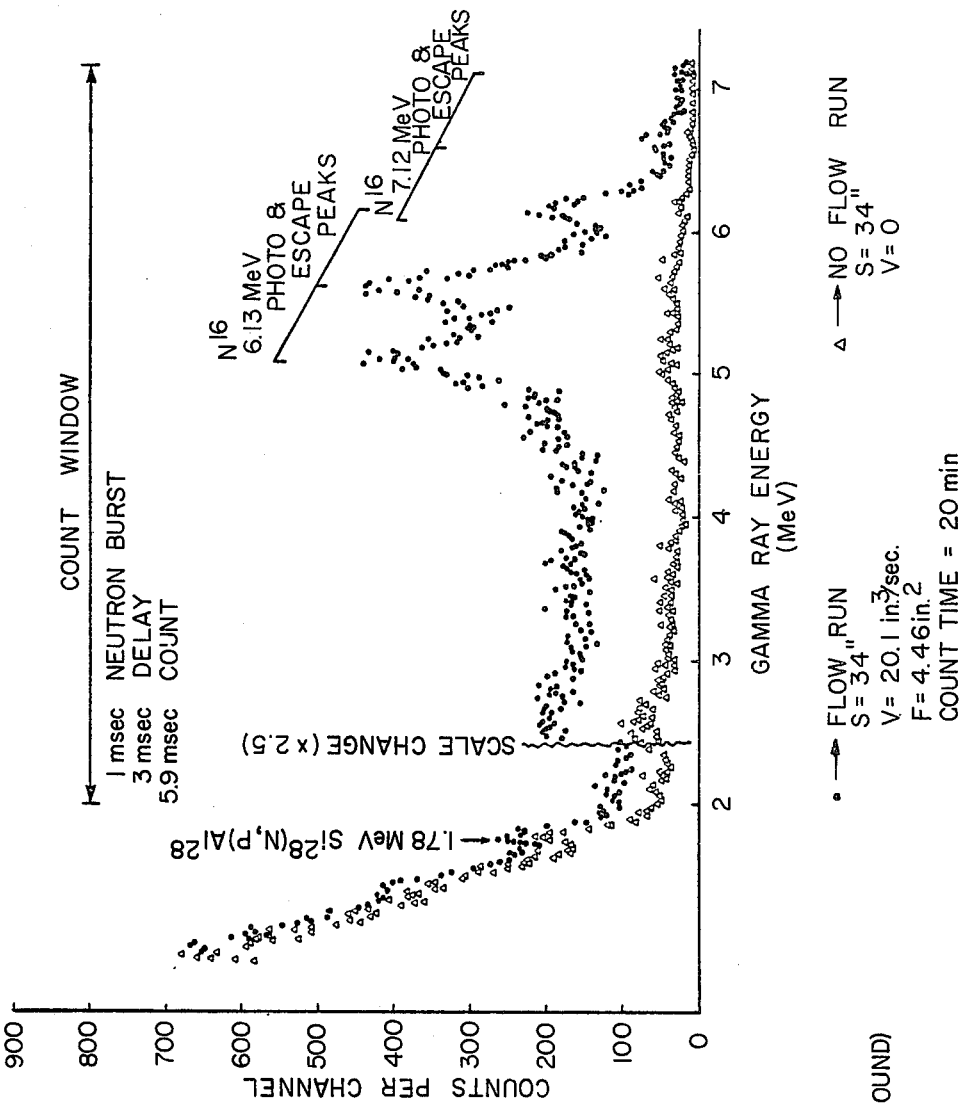
FIG. 3 is a graphical representation of the response of a pulsed neutron source water flow detection system under flow and no flow conditions.

Most prompt neutron caused gamma radiation will occur within one millisecond after the cessation of a pulse of neutrons. If, for example, the neutron source is turned on for one millisecond and gamma ray detection is delayed for 3 milliseconds subsequent to the cessation of neutron burst before the detectors are activated, then the prompt neutron caused gamma radiation will decay to a negligible level. By then counting the oxygen activation induced gamma radiation which remains for approximately 6 milliseconds, the relatively high level background radiation as illustrated in FIG. 3 may be significantly reduced. This entire pulse-delay-count cycle is then repeated approximately 100 times per second. Of course, it may be desired for other reasons to operate the neutron source in a continuous mode and this is possible as illustrated by FIG. 2, but is subject to higher background counting rate.

Although the duty cycle of the neutron source under pulse mode operation conditions is only 10 percent in this mode of operation, the neutron output while the source is on is approximately a factor 10 times greater than the continuous neutron output if the source is operated continuously. Thus, the integrated neutron output is approximately the same in pulsed and continuous modes of operation. Under pulsed conditions the duty cycle of the detectors is approximately 60 percent (i.e. 6 of 10 milliseconds). If the count acceptance energy window illustrated in FIG. 2 (approximately 4.45 MEV to approximately 7.20 MEV) used for the continuous mode operation were used for the pulsed mode operation, the net counting rate from the decay of the unstable isotope $N^{16}$ would be reduced to approximately 60 percent of that for the continuous mode. However, under pulsed conditions, essentially none of the prompt neutron gamma radiation is recorded. Since there is no major component of element activation radiation other than that from the unstable $N^{16}$ isotope above 2.0 MEV, it is possible to widen the count acceptance energy window when using the pulsed mode from approximately 2.0 to approximately 7.20 MEV. This change of range of the counting energy window will thus include additional counts from Compton scattered, energy degraded, 6.13 and 7.21 MEV gamma radiation due to the oxygen activation and will thereby increase the count rate to offset the losses due to the approximately 60 percent duty cycle of the detectors in this pulsed mode of operation. FIG. 3 illustrates dramatically the reduced background effect by using the pulsed mode of operation. In the illustration of FIG. 3 the same source detector spacing (34 inches) is utilized as in FIG. 2 and the broadened counting energy window at the detector as previously mentioned is utilized.

To summarize, by operating the neutron generator in a pulsed mode of operation the magnitude of the signal from the oxygen activation reaction remains approximately the same while the background radiation is reduced substantially by eliminating the recording of prompt N-$\gamma$ radiation. This increase in the signal to noise ratio of the desired counting signal reduces the statistical error of the quantity $C_1 C_2$.

TECHNIQUE FOR DETERMINING R

Recalling equations 16 and 17, it will be observed that it is possible to measure the linear flow velocity $v$ and the angle of flow $\theta$ of the water behind the casing provided a technique for determining $R_1$ and $R_2$ the radial distance from the center of the water flow to the center of the near and far detectors, respectively, can be measured. It is possible to measure R by using a technique which will now be described in more detail.

Figure 4:
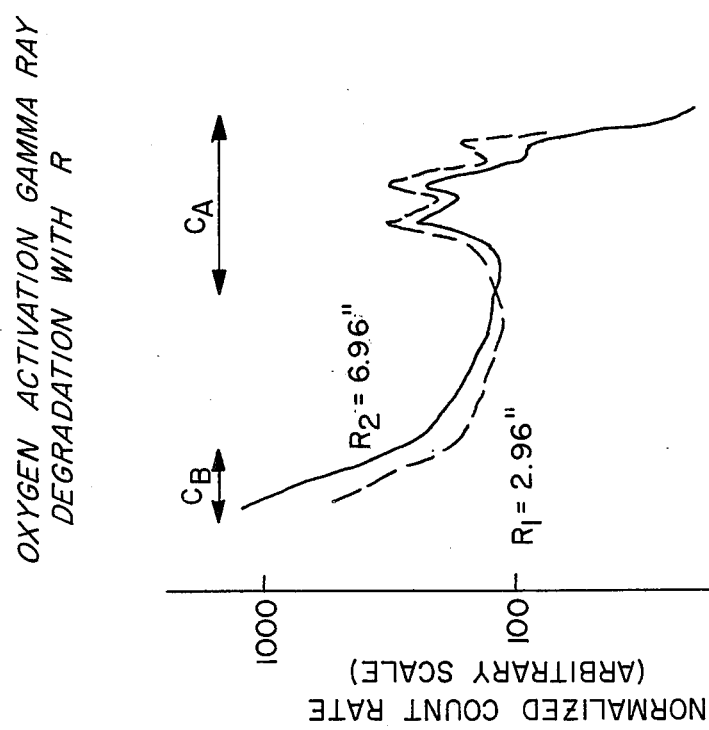
FIG. 4 is a graphical representation showing gamma ray spectral degradation as the source of gamma rays is moved to a different distance from a detector.

The second technique (concentric axis) not discussed for determining R may be considered a gamma ray spectral degradation technique. Referring now to FIG. 4, two gamma ray spectra resulting from the decay of radioactive nitrogen 16 produced by oxygen activation with a water flow meter sonde of the type contemplated for use in the present invention is illustrated schematically. The spectra of FIG. 4 are taken at the same detector in the flow meter sonde and illustrate the counting rate at the detector resulting from a water flow whose center is $R_1$ and $R_2$ inches from the center of the detector. The broken curve in FIG. 4 illustrates a gamma ray spectrum resulting from the decay of radioactive nitrogen 16 in a water flow whose center is at a distance $R_1$ equal approximately 2.96 inches from the center of the water flow sonde detector. The solid curve in FIG. 4 illustrates a gamma ray spectrum resulting from the decay of radioactive nitrogen 16 in a water flow whose center is at a distance $R_2$ equals approximately 6.96 inches from the center of the detector. In the illustration of FIG. 4, thus $R_2$ is greater than $R_1$. Also illustrated by the double ended arrows in FIG. 4 are two energy range counting windows A and B. Window A includes the 7.12 and 6.13 MEV photo and escape peaks from the radioactive nitrogen 16 which are primary radiation which reach the detector without Compton scattering collosions primarily. Window A is a radiation energy window for detecting primary gamma radiation which has been degraded in energy through collosions (Compton scattering).

If $C_A(R)$ is defined as the count rate recorded in window A for arbitrary R and $C_{B(R)}$ is the count rate recorded in window B for arbitrary R, it can be seen that:

$$C_A(R_2)/C_B(R_2) \; C_A(R_1)/C_B(R_1)$$

For $R_2 R_1$ \hfill (19)

The ratio inequalities $C_A/C_B$ in equation 19 which result in this manner are due to the fact that a larger fraction of the primary 6.13 and 7.12 MEV gamma radiation is degraded by collosions with the intervening material as the distance R between the activated water flow and the detector is increased. Thus by calibrating a system for water flow detection in terms of the spectral degradation as a function of the radial distance R, a tool is provided for determining the unknown radial distance R to the center of flow. The distance R may then in turn be used in connection with equations (14), (16) and (17) for quantitatively determining the volume water flow $v$, the linear velocity $v$, and the angle $\theta$.

Figure 5:
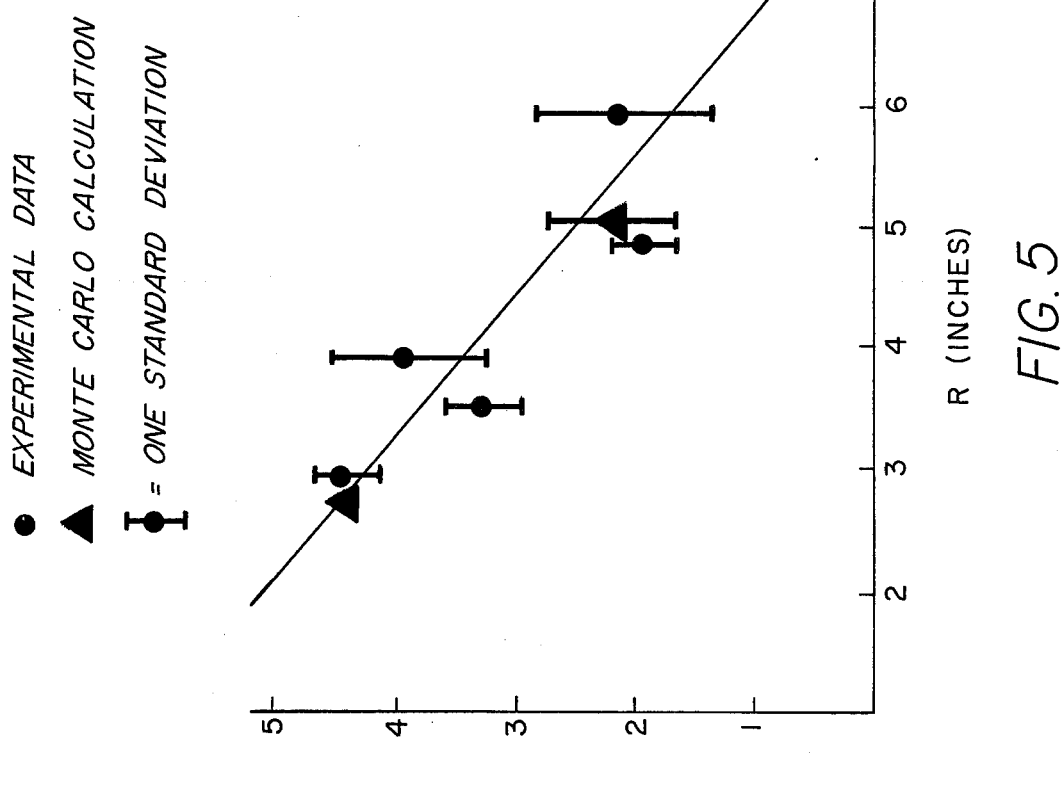
FIG. 5 is a graphical representation showing the count rate ratio of two energy windows of a detector as a function of distance.

Referring now to FIG. 5, the results of an experimental calibration of the ratio of counting rates $C_A/C_B$ which were measured in known test flow conditions as a function of R are plotted with the standard deviation error bars associated therewith. Also plotted in FIG. 5 are the results of a monte carlo computer calculation for a 6.13 MEV point gamma ray source at various distances R from a gamma ray detector. The monte carlo calculations are based on probability theory and are used to predict the uncollided or undegraded gamma ray flux as a function of the radial distance of the source to the detector using the known laws of physics concerning the Compton scattering phenomena. It will be noted that there is excellent agreement between the experimental curve and the monte carlo calculations as the data points of FIG. 5 indicate.

In the two detector water flow sonde to be subsequently described in more detail, the ratio of the counting rates at the two selected energy windows $C_A$ and $C_B$ from the each detector can be measured.

The radial distance $R_1$ from the center of the water flow to the center of the near detector may then be determined by comparing the ratio of background corrected counting rates $C_A/C_B$ recorded by detector 1 with the relationship illustrated in FIG. 5. Likewise the radial distance $R_2$ from the center of the water flow to the center of the far detector may be determined by comparing the ratio of background corrected counting rates $C_A/C_B$ recorded by detector 2 with the relationship illustrated in FIG. 5. The resulting valves of $R_1$ and $R_2$ along with the previously defined counting rates $C_1$ and $C_2$ can be used to compute $v$, the linear flow velocity, and $\theta$ the flow angle using the relationship of equations (16) and (17). The relationship of equation (14) can be used to infer V, the volume flow rate, once R and $v$ are determined in this manner.

DESCRIPTION OF THE EQUIPMENT

The equipment used to make the water flow measurements previously discussed relies on the activation of the oxygen 16 nuclei by the capture of neutrons with energy equal to or greater than 10 MEV. This necessitates the use of a neutron generator which can generate a sufficient intensity of neutrons having an energy of 10 MEV or greater to perform the measurement. The most commonly available such neutron generators are those relying on the deuterium-tritium reaction to generate this flux of high energy neutrons at a sufficient intensity to perform measurements of this type. The deuterium-tritium reaction neutron generators are generally referred to as accelerator type neutron sources.

Accelerator type neutron sources generally comprise an evacuated envelope having a target material at one end thereof which is impregnated with a high percentage of tritium. This target is kept at a high negative potential (approximately 125 KV) with respect to the source of deuterium nuclei which are to be accelerated onto it. At the opposite end of the evacuated container is an ion source and a source of deuterium nuclei usually termed replenisher. In operation, such accelerator sources generate a concentration of deuterium ions from the ion source which are focused by electrostatic lenses into a beam and accelerated by the high negative potential onto the target material which is impregnated with the tritium nuclei. Due to the high acceleration voltage, the electrostatic Coulomb repulsion between the deuterium nuclei and the tritium nuclei is overcome and the thermonuclear fusion reaction takes place generating a relatively high intensity of neutrons having an energy of approximately 14 MEV.

In constructing the equipment to perform the water flow measurements previously discussed, since it is necessary to use an accelerator type neutron source, a problem arises in the physical construction of the downhole portion of the system. This problem is caused by the fact that a high voltage power supply is necessary to generate the approximately 125 KV potential required by the neutron source for the acceleration of the deuterium ions. Perhaps the most efficient such high voltage power supply is a multiple stage Cockroft-Walton Voltage Multiplier Circuit. A circuit arrangement for generating a high voltage such as that required by the accelerator tube when placed in a well logging instrument requires considerable longitudinal extent in order to stack the voltage multiplying stages longitudinally along the length of the well logging instrument while providing sufficient insulation about these voltage multiplying stages to prevent voltage breakdown of the insulators.

Referring now to FIGS. 6A, 6B, and 6C, the downhole sonde for the water flow detection measurement is illustrated schematically. The sonde is made up of several component sections which may be physically rearranged to perform steps in the detection of the water flow behind the casing according to the principles previously discussed. The upper end of the sonde is provided with a head member 91 approximately 10 inches in longitudinal extent. A control and detector electronics section 92 is attached to the head section and is approximately 75 inches in longitudinal extent. The detector section 93 houses two gamma ray detectors which may comprise thalium activated sodium iodide crystal detectors (approximately 2 inches by 4 inch cylinders in appearance) and an iron shielding member which is interposed on the end opposite the neutron generator. Below the detector section in FIG. 6A is the neutron generator and power supply section housing the neutron generator 94 and the 125 KV high voltage power supply 95. The spacings preferred between the neutron source and the detectors in the assembled instrument are, respectively, 23 inches and 42 inches as shown in FIG. 6. The neutron source and power supply section is approximately 94 inches in length. Finally, at the lower end of the sonde is a protective bull plug assembly 96 which serves to protect the lower extremity of the sonde should it come into contact with the bottom of the borehole or some obstruction therein.

The problem which arises is due to the longitudinal extent (94 inches) of the high voltage power supply. It will be realized by those skilled in the art that in order to detect water flow in an upward direction that the flow must first pass the neutron source and then subsequently pass the detectors in its movement. This implies the configuration illustrated in FIG. 6B where the detector section 93 of the well logging instrument is placed above the high voltage power supply and neutron generator section 94 and 95. However, in order to detect water flow in a downward direction, the configuration illustrated in FIG. 6C is required wherein the downward water flow must first pass the neutron source and then pass the gamma ray detectors in order to make the flow measurement as previously described. In this configuration, the neutron source-power supply section 94, 95 must be placed above the detector section 93 on the downhole instrument.

Since the gamma ray detectors must be located within a reasonable distance of the neutron generator target, the tritium impregnated target of neutron source 94 must be located as close as possible to the shield portion of the detector section 93 of the instrument. This requires the design of a neutron source 94 power supply 95 section which is reversible (i.e. connectable to operate from either end) when going from the configuration shown in FIG. 6B to that shown in FIG. 6C in order to detect water flow in an upward or a downward direction, respectively. Similarly, all of the component portions of the downhole instrument of FIG. 6 are constructed in a modular fashion. These modules may be joined by screw type fluid tight assemblies and sealed against the incursion of borehole fluid by sealing means at each of these junctions.

The downhole sonde illustrates schematically in FIG. 6 is also provided with centralizer member 97 which may comprise cylindrical rubber arms or the like which extend outwardly into touching engagement with the inside walls of the well casing when the sonde is lowered into borehole for measuring purposes. These centralizer arms 97 maintain the body of the sonde in a central position within the casing in order to assist in preserving cylindrical symmetry of the measurements. If the sonde were able to lie against one side of the well casing, it could fail to detect water flow on the opposite side of the casing member because of a lack of sensitivity due to the increase distance from the neutron source and detectors to the flowing water.

The electronics section 92 of the downhole sonde functions, as will be described in more detail subsequently, to control the operation of the neutron source 94 and to furnish high voltage power for the operation of the detectors which are contained in the detector section 93 of the sonde. The electronics section 92 also serves to provide synchronization (or sync) pulses at the beginning of each neutron burst. The electronics section 92 also contains circuit means to transmit electrical pulse signals from the detectors and sync pulse signals up to the well logging cable to the surface.

Figure 7:
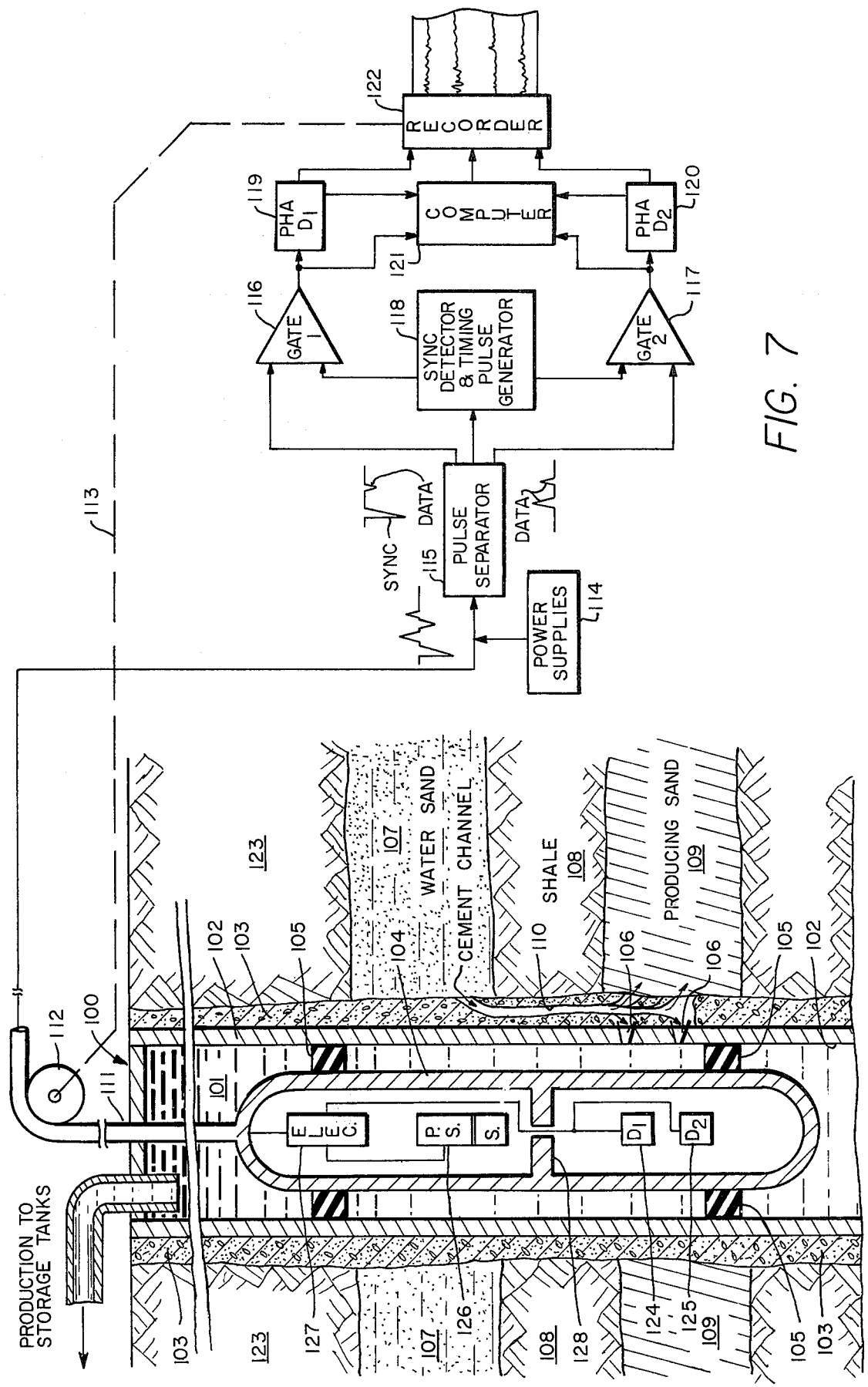
FIG. 7 is a schematic representation of a water flow detection system in a cased well bore according to the invention.

Referring now to FIG. 7, a well logging system in accordance with the concepts of the present invention is shown in a borehole environment with the surface equipment portion thereof and is illustrated schematically. A downhole sonde 104 which in practice is constructed in the modular manner illustrated with respect to FIGS. 6A, 6B, and 6C, is suspended in a well borehole 100 by an armored well logging cable 111 and is centralized by centralizers 105 as previously described with respect to the interior of the well casing 102. The cased borehole is filled with a well fluid 101. The downhole sonde of FIG. 7 is provided with dual gamma ray detectors 124 and 125 which are shown mounted in configuration shown in FIG. 6C for detecting water flow in a downward direction behind the casing 102. The downhole sonde is also provided with a 125 KV power supply and neutron generator 126 of the type previously described. The electronics section 127 of the downhole instrument 104 corresponds to electronics section 92 of FIGS. 6A, 6B, and 6C.

Earth formations 123, 107, 108, and 109 are penetrated by the borehole 100. A cement channel 110 on one side of the cement sheath 103 of the cased wellbore is illustrated allowing undesired fluid flow in a downward direction from a water sand 107 which contaminates a producing sand 109 separated from the water sand 107 by a shale layer 108. With the well logging instrument 104 placed in the position shown and with the detector source configuration illustrated in FIG. 7, the instrument 104 is capable of detecting undesired water flow from the water sand 107 through the cement channel 110 into the producing sand 109. Perforations 106 in the casing 102 allow fluid from the producing sand to enter the well borehole 100 as well as allowing the undesired water flow down the cement channel 110 to enter the borehole 100. In the configuration shown in FIG. 7, high energy neutrons from the neutron source 126 penetrate the steel casing 102 and activate the elemental oxygen in the water flow from water sand 107 through cement channel 110. The water flowing in channel 110 then continues past detectors 124 and 125 sometime later and gamma rays resulting from the decay of the radioactive nitrogen 16 are detected in the manner previously described by the detectors 124 and 125. Electrical pulses whose height is proportional to the energy of the impending gamma rays detected by the detectors 124 and 125 are transmitted to the electronic section 127 of the downhole instrument and from there coupled to the well logging cable 111 conductors and transmitted to the surface in a form which will be described in more detail subsequently.

Figure 8:
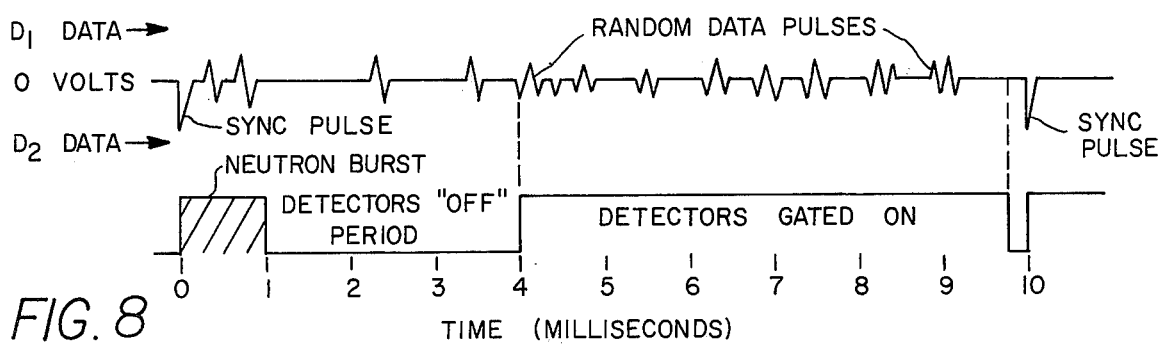
FIG. 8 is a schematic diagram illustrating the timing and data transmission format of the water flow detection system of the invention.

Referring now to FIG. 8, a timing chart for the instrumentation of FIG. 7 is shown together with the pulse wave forms appearing on the logging cable 111. The electrical pulse signals representative of the energy of the gamma rays at the detectors 124 and 125 are illustrated in the top portion of the drawing of FIG. 8 while the lower portion of the drawing of FIG. 8 is a schematic representation of the timing involved in the operation of the system of FIG. 7. It will be observed as previously described, that a one millisecond duration neutron burst is initiated at time T = O and extends through time T = O plus one millisecond. Simultaneously with the initiation of the neutron burst in the downhole instrument, a large amplitude negative polarity synchronization (or sync) pulse is generated by the electronic section 127 of the downhole instrument and coupled to the conductors of well logging cable 111. The amplitude of the sync pulse is made greater than any possible data pulse amplitude from the detectors. Electrical pulse signals representative of randomly occurring gamma rays impinging upon detectors D1 and D2 in the downhole instrument 104 are coupled continuously to conductors of the well logging cable 111 for transmittal to the surface by the electronic section 127 also. The pulses from detector D1 are applied to the cable conductor as negative polarity voltage pulses while pulses representative of the gamma rays detected D2 are applied to the cable conductor as positive polarity voltage pulses. At the surface a pulse separator 115 is used to discriminate the detector D1 pulses from the detector D2 pulses on the basis of their electrical polarity. The negative polarity pulses are supplied as input to a synchronization pulse detector 118 and as one input to a time gate 116. The positive going pulses from detector D2 are supplied as one input to a time gate 117.

The synchronization pulse detector 118 detects the large amplitude negative sync pulses on the basis of amplitude and supplied conditioning pulses to the time gates 116 and 117 beginning at a time 4 milliseconds after the initiation of the neutron burst. Thus, there is a 3 millisecond time interval between the end of the neutron burst and the conditioning of time gates 116 and 117 by the synchronization detector and timing pulse generator circuit 118.

The output of both detectors D1 and D2 are continuously supplied to the well logging cable 111 but are thus prevented from reacing subsequent circuitry by the action of time gates 116 and 117 which allow the randomly occurring data pulses to reach the processing circuitry by the action of time gates 116 and 117 which allow the randomly occurring data pulses to reach the processing circuitry only during the 5.85 millisecond duration interval beginning at 4 milliseconds after T = O and extending until 9.85 milliseconds after T = O as illustrated in the timing chart of FIG. 8.

When time gates 116 and 117 are enabled by the conditioning pulse from sync pulse detector 118, the data pulses from the downhole detector pair 124 and 125 are coupled as inputs to pulse height analyzers 119 and 120 respectively. These pulse height analyzers perform the spectral energy separation of gamma rays detected by the downhole instrument 104 at each of the detectors 124 and 125 according to the energy windows previously described. Thus the spectral degradation technique previously described may be used to derive the distance R from the center of the detector to the center of the flowing water in the cement channel 110 by the method previously described with respect to the calibration chart of FIG. 5. For this purpose, the energy discriminated pulse height information from pulse height analyzers 119 and 120 is supplied to a small computer 121 which may comprise a general purpose digital computer of the type PDP-11 which is manufactured by the Digital Equipment Corporation of Cambridge, Mass. The computer 121 may then, when supplied with the energy discriminated information, apply the count ratio technique described previously with respect to the relationship of FIG. 6 in order to determine R the distance to the center of the water flow from either or both of the detectors.

It will be appreciated by those skilled in the art that given the previously discussed relationships for determining R that such a general purpose digital computer may be programmed, for example in a commonly used programming compiler language such as FORTRAN or the like, to perform the calculations necessary to derive the linear flow velocity $v$, the flow angle $\theta$, the volume flow rate V and R. Output signals representative of this desired information are conducted from the computer 121 to a recorder 122. The recorder 122, as indicated by the broken line 113, may be electrically or mechanically coupled to a sheave wheel 112 in order to display the quantities of interest as a function of the depth of the well logging instrument in the borehole. Similarly, the count information processed by the multichannel pulse height analyzer 119 and 120 may be conducted to the data recorder 122 and plotted or displayed as a function of the borehole depth of the logging instrument 104.

The foregoing description may make other alternative arrangements apparent to those skilled in the art. It is, therefore, the aim of the appended claims, to cover all such changes and modifications as fall within the true spirit and scope of the invention.

We claim:

1. A method for measuring the location, linear flow rate, volume flow rate and angle of flow of undesired water flow at an angle $\theta$ to the borehole axis behind well casing in a producing well, comprising the steps of:
   a. locating a well tool sized for passage through a well bore and having a source of high energy neutrons at least some of which have sufficient energy to cause the nuclear reaction $O^{16}(n,p)N^{16}$ and at least two gamma ray detectors longitudinally spaced from said source and each other in a well bore at a depth to be investigated;
   b. irradiating the borehole environs with high energy neutrons from said source;
   c. detecting at said detectors gamma rays resulting from the decay of the unstable isotope $N^{16}$ comprising a portion of any undesired behind casing flow present and generating count signals representative thereof;
   d. separating said count signals from each of said detectors into at least two separate energy dependent signals related to the energy of the gamma rays causing said signals and generating a ratio signal representative of the ratio of the at least two separate energy dependent signals at each of said detectors;
   e. combining said count signals from said detectors according to a first predetermined relationship to derive an indication of the linear flow rate of undesired behind casing water flow in a preferred direction;
   f. generating from said ratio signals according to a second predetermined relationship an indication of the radial distances $R_1$ and $R_2$ from said dual spaced detectors to the undesired behind casing water flow;
   g. combining said indication of linear flow rate and at least one of said indications of radial distance according to a third predetermined relationship to derive an indication of the volume flow rate of the undesired behind casing flow; and
   h. deriving from said indicatios of radial distances $R_1$ and $R_2$ at each of said detectors, an indication of $\theta$, said angle of flow with respect to the borehole axis.

2. The method of claim 1 wherein the separating step is performed by separating said count signals from at least one of said detectors into two energy dependent signals representative of the count of gamma rays occurring in two relatively wide energy regions of the gamma ray energy spectrum, one of said energy regions being at relatively high gamma ray energies and the other at relatively lower gamma ray energies.

3. The method of claim 2 wherein said two separate energy regions are taken to be from about 3.25 MEV to about 4.0 MEV and from about 4.9 MEV to about 6.5 MEV.

4. The method of claim 1 and further including the steps of:
   removing the well tool from the borehole after the measurements are made at said location;
   reversing the juxtaposition of said source and said detectors;
   relocating said tool at said location with said detectors juxtaposition reversed; and
   repeating steps (b), (c), (d), (e), (f), (g), and (h).

5. The method of claim 4 wherein the steps are performed while moving said well tool at a known rate past the location to be investigated.

6. The method of claim 1 wherein the steps are performed while moving said well tool at a known rate past the location to be investigated.

7. A method for measuring the location, linear flow rate and volume flow rate of undesired water flow behind well casing in a producing well, comprising the steps of:
   a. locating a well tool sized for passage through a well bore and having a pulsed source of approximately 14 MEV neutrons and at least two gamma ray detectors longitudinally spaced from said source and each other in a well bore at a depth to be investigated;
   b. repetitively irradiating the borehole environs with bursts of fast neutrons from said source;
   c. detecting at said detectors gamma rays resulting from the decay of the unstable isotope $N^{16}$ comprising a portion of any undesired behind casing flow present and generating count signals representative thereof;
   d. separating said count signals from each of said dual spaced detectors into at least two separate energy dependent signals related to the energy of gamma rays causing said signals and generating a pair of ratio signals representative of the ratio of the at least two separate energy dependent signals at each of said detectors;
   e. combining said count signals from said detectors according to a first predetermined relationship to derive an indication of the linear flow rate of undesired behind casing water flow in a preferred direction;
   f. generating from said ratio signals according to a second predetermined relationship a pair of indications of the radial distances $R_1$ and $R_2$ from each of said detectors to the undesired behind casing water flow;
   g. combining said linear flow rate indication and said radial distance indication according to a third predetermined relationship to derive an indication of the volume flow rate of the undesired behind casing flow; and
   h. deriving from said radial distance $R_1$ and $R_2$ indications, an indication of the angle $\theta$, of the undesired fluid flow with respect to the axis of the borehole.

8. The method of claim 7 wherein the separating step is performed by separating said count signals from each of said detectors into two energy dependent signals representative of the count of gamma rays occurring in two relatively wide energy regions of the gamma ray energy spectrum, one of said energy regions being at relatively higher gammay ray energies and the other at relatively lower gamma ray energies.

9. The method of claim 7 wherein said two separate energy regions are taken to be from about 3.25 MEV to about 4.0 MEV and from about 4.9 MEV to about 6.5 MEV.

10. The method of claim 7 and further including the steps of:
    removing the well tool from the borehole after the measurements are made at said location;
    reversing the juxtaposition of said source and said detectors;
    relocating said tool at said location with said detectors juxtaposition reversed; and
    repeating steps (b), (c), (d), (e), (f), (g), and (h).

11. The method of claim 10 wherein the steps are performed while moving said well tool at a known rate past the location to be investigated.

12. The method of claim 7 wherein the steps are performed while moving said well tool at a known rate past the location to be investigated.

* * * * *